United States Patent [19]
Ido et al.

[11] Patent Number: 5,645,093
[45] Date of Patent: Jul. 8, 1997

[54] PRODUCT COLLECTING DEVICE FOR USE IN APPARATUS COATING SEED WITH GEL

[75] Inventors: Yoichi Ido; Yasushi Kohno; Kazushi Nakatsukasa, all of Susono, Japan

[73] Assignee: Yazaki Corp., Tokyo, Japan

[21] Appl. No.: 561,424

[22] Filed: Nov. 21, 1995

[30]     Foreign Application Priority Data

Nov. 25, 1994   [JP]   Japan .................. 6-291216

[51] Int. Cl.[6] .................. B08B 3/04; B08B 13/00
[52] U.S. Cl. .................. 134/104.3; 118/56; 210/455
[58] Field of Search .................. 134/104.2, 104.3; 118/56; 210/455

[56]         References Cited
         FOREIGN PATENT DOCUMENTS 62-266137   11/1987   Japan .
63-197530   8/1988    Japan .
4-141005    5/1992    Japan .
7-63607     7/1995    Japan .

*Primary Examiner*—Philip R. Coe
*Attorney, Agent, or Firm*—Nikaido Marmelstein Murray & Oram LLP

[57]            ABSTRACT

A product collecting device for use in an apparatus for coating seed with gel includes a product receiving case, a top portion of which is open, arranged in a downward direction of water wash bath. A partition wall is provided for a bottom wall of the product receiving case. A product collecting port is provided for one side of the partition wall. The other side of the partition wall is provided with a draining hole located directly under a carrying out side end portion of the water wash bath. A draining chute which covers the other side of bottom wall, is inclined downward toward the product collecting port water breaking hole is provide in such a way that a length of the water breaking hole is long along the direction both of inclination and hardening.

3 Claims, 8 Drawing Sheets

PRODUCT COLLECTING DEVICE FOR USE IN APPARATUS COATING SEED WITH GEL

BACKGROUND OF THE INVENTION

1. Field of the Invention

The present invention relates to a product collecting device for use in an apparatus for coating seeds with gel wherein a surface of a gel coated seed which is coated with high molecular gel is immersed into a hardening agent for a definite time, after which the gel coated seeds are put into a water wash bath so as to remove the hardening agent from a surface thereof. The gel coated seeds are then discharged with the water from an end portion of the water wash bath. Thereafter, the gel coated seeds are collected separately with respect to the water.

2. Description of the Prior Art

Generally speaking, seeds are planted without coating. There are coated seeds to protect the seeds from damage by coating the surfaces thereof with coating material. In the conventional art, there exists a coating technic for seeds which are coated by molding with dusting powder, the object of which is capable of being planted by means of a mechanical seeder. Accordingly, the seeds which are unnaturally helped to germinate early can not be planted by the present mechanical seeder.

In this conventional coating method for the seeds, the seeds are sprayed with adhesive agent called binder thereafter it causes the coating agent to adhere to the surfaces of the seed by using a drum. Accordingly, it is difficult for an ordinary farmer to practice this coating method in a small-scale.

Two capsulization apparatuses which cause seed and the like to seal into capsules by using high molecular gel are disclosed in Japanese Patent Application Laid-Open Nos. sho 62266137 and sho 63-197530. It is difficult for two capsulization apparatuses to control the number of enclosures, capsule diameter and hardness of the gel coated layer, since both apparatuses cause the enclosure to disperse into gelation agent when dropped into the hardening agent. The applicant for solving these problems has made an apparatus (referring to Japanese Patent Application Laid-Open No. hei 4-141007) for coating seeds with gel for automatization in one continuous operation from coating of the seeds to the water separation. A gel coated seed is roughly formed to a certain size of spherical body by coating the seed with gel film and then the gel coated seed is dipped into the hardening bath filled with a hardening agent for a definite time so as to harden only the surface layer with a required thickness. Thereafter, the hardening agent is removed by washing the gel coated seed and then separated therefrom.

The water wash bath, the hardening bath and the collecting mechanism of the apparatus as described above will be described. As shown in the plan view of FIG. 10, the hardening bath 3 is provided for the watercourse stand 2 suspended within the casing 1.

The hardening bath 3 comprises a receiving part 4 into which the gel coated seeds are supplied in such a way that the coated seeds drop into the receiving part 4. A conveyance passage 5 is connected to the receiving part 4. A partition wall 6, an upper end of which is sunk into the hardening agent is provided at a left end portion of the conveyance passage 5. A screw conveyor 8 is rotatably supported between the partition wall 6 and a right end wall 7 of the conveyance passage 5. A sweeping blade 8a is fastened to a carrying out side (right end side in FIG. 10) of the screw conveyor 8. A coupling 9 couples the screw conveyor 8 to an output shaft of the motor 10.

Figure 10:
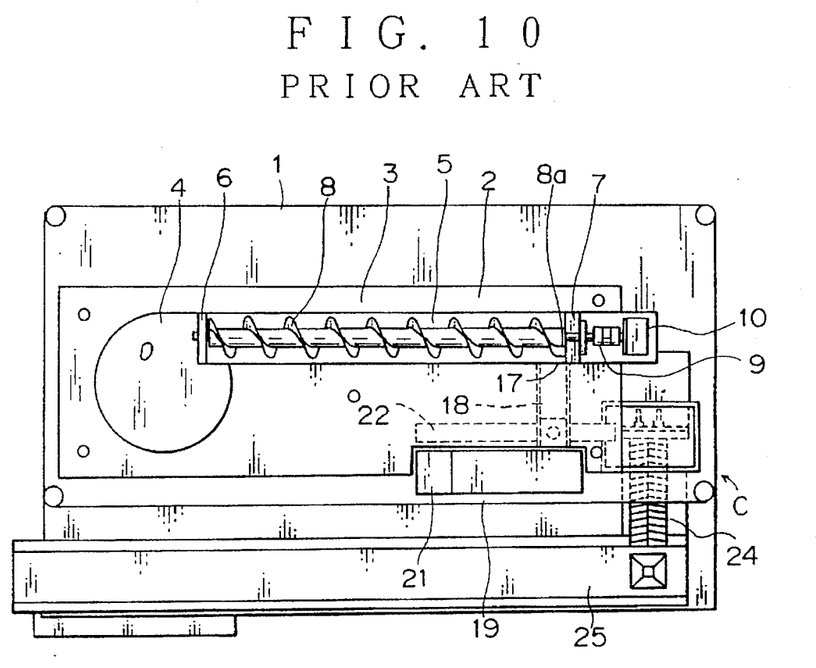
FIG. 10 is a plan view showing a hardening bath, a water wash bath and a water breaking mechanism of a conventional apparatus for coating seed with gel.
Figure 11:
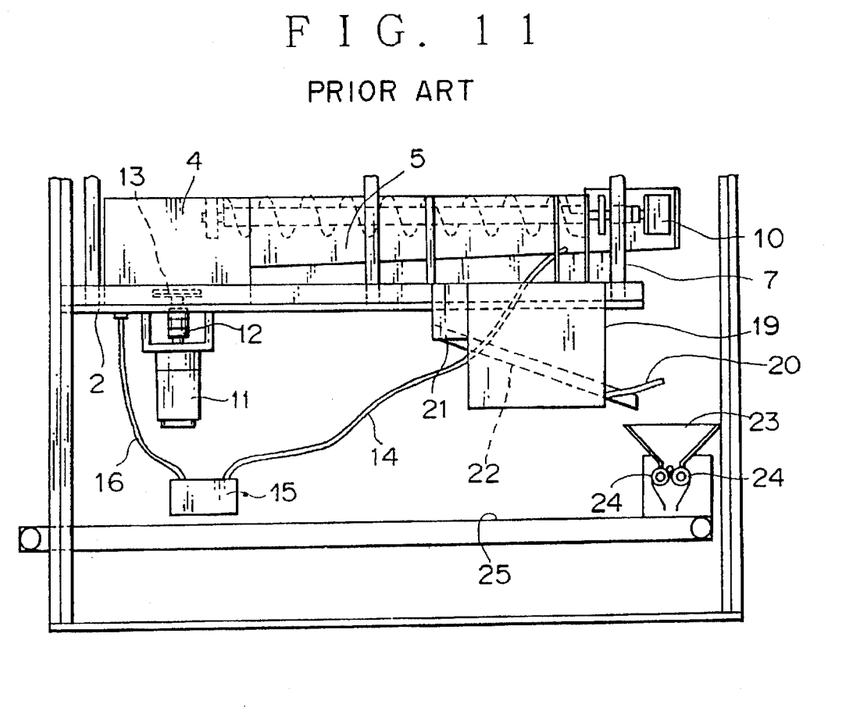
FIG. 11 is an elevational view of FIG. 10.

The output shaft of the motor 11, which is provided for an outer bottom wall of the receiving part 4, is coupled to an impeller 13 within the receiving part 4 through the coupling 12. The hardening agent contained in the hardening bath 3 streams from the receiving part 4 to the conveyance passage 5 by virtue of the revolution of the impeller 13.

The hardening agent, fed to the conveyance passage 5, is circulated by way of a pipe passage 14, a pump 15, and a pipe passage 16.

On the outside of a carrying out port 17, provided for the right side of the conveyance passage 5, a chute 18 is provided therefor which has a slope becoming low toward a pointed head of a lower part, and the bottom wall pierced with many holes. A water wash bath 19 is provided for the downward direction of the pointed head of the chute 18.

The water is contained in the water wash bath 19. A pipe passage 20, which is connected to the right end portion of the water wash bath 19, is coupled to the water supply source.

An overflow tank 21 which has a net on the top surface is provided for the left end of the water wash bath 19 as the water is exhausted from the overflow tank 21 outwardly, the gel coated seeds are carried to a sliding way 22 in such a way that the gel coated seeds roll on the net. Then the gel coated seeds are fed to two feed screws 24 passed through a hopper 23 from the pointed end portion of the sliding way 22. Thereafter the coated seeds are shifted from the feed screw 24 to a belt conveyor 25 by virtue of the revolution of the feed screw 24.

As described above, the gel coated seeds are supplied to the receiving part 4 of the hardening bath 3, then they are fed to the water wash bath 19 through the conveyance passage 5 for a definite time, and they are shifted to the belt conveyor 25 by virtue of the feed screw 24 after separating the rinsed coated seeds from the water.

However, there are the following problems in this apparatus for coating seed with gel:

(1) For the gel coated seeds, the net of the overflow tank 21 for the water wash bath 19 is insufficient for water separation from the therefore the extra separation mechanism has become necessary in which only the gel coated seeds are carried while removing the water on the feed screw 24. Consequently, there is a defect that the whole structure of the apparatus for coating seed with gel becomes complex.

(2) The water separated from the gel coated seeds can not be retrieved sufficiently by the net of the overflow tank 21 and the water drops downward on the feed screw 24, with the result that collecting equipment which can retrieve the water comprehensively becomes necessary.

SUMMARY OF THE INVENTION

In view of the foregoing, it is an object of the present invention for resolving the above-mentioned problems to provide a compact product collecting device which can fully separate the gel coated seeds from the water.

According to one aspect of the present invention, for achieving the above-mentioned object, there is provided a product collecting device for use in an apparatus for coating seeds with gel in which the surface of the gel coated seeds are rinsed in a water wash bath, then the gel coated seeds which are carried out from the wash bath are collected by means of the product collecting device. The product collecting device has a product collecting port which is provided on one side of a partition wall extending from a bottom wall and which is located in a downward direction of a carrying out side end portion for the water wash bath. A top portion of the product collecting device is open. A product receiving case which is provided on the other side of the partition wall, has a draining hole. The other side of the partition wall is arranged so as to be located directly under the carrying out side end portion. A plurality of water breaking holes are arranged in such a way that they cross at right angles to the product collecting port. A draining chute, which covers an upper portion opposite to the bottom wall of the other side, is inclined downward toward the product collecting port with such a slope that the gel coated seeds can roll thereto.

According to another aspect of the present invention, there is provided a product collecting device, for use in an apparatus for coating seeds with gel, with a leg which extends downward to the bottom wall, and provide on lower side of the draining chute. An opening for water breaking is formed between the end portion of lower side of the draining chute and the partition wall, by placing the leg on the bottom wall of the other side. Thus, a width of the opening for water breaking is the size that the gel coated seeds which rolls on the draining chute pass through without dropping thereto.

According to further aspect of the present invention, there is provided a product collecting device for use in an apparatus for coating seed with gel with a bottom cover which is capable of opening and closing the product collecting port, and which is mounted to the product receiving case. A lever is provided for opening the cover and is provided on an outer bottom surface of the bottom cover. The lever causes the cover to close, when the product collecting cage the top of which is open is placed in a downward direction. The lever is also for opening the cover which causes the bottom cover to move in an opposite direction from the closing direction.

As stated above, in the product collecting device for use in the apparatus for coating seeds with gel according to the present invention, the gel coated seeds and the water are exhausted from the carrying out end portion of the water wash bath, dropping onto the draining chute.

The spheroidized gel coated seeds are supplied to the product collecting port while rolling on the draining chute.

On the other hand, the water drops in a downward direction through the water breaking holes, by flowing toward the product collecting port, and then is exhausted in the downward direction by passing through the draining hole.

As stated above, since the product collecting device is provided with the leg which extends downward to the bottom wall, and is provided with the draining chute having openings for water breaking of a width that the gel coated seeds pass over by placing the leg on the bottom wall of the other side, of the partition, the separation of the gel coated seeds from the water can be performed, and separation of the gel coated seeds from the water improves. As stated above, since the product collecting device is provided with the bottom cover which is capable of opening and closing the product collecting port, and which is mounted to the product receiving case with a lever on the outer bottom surface of the bottom cover for opening the cover, when the product collecting cage the top of which is open is placed in downward direction, the lever for opening the cover causes the bottom cover to move, so that when the product collecting cage is placed under the product receiving case the gel coated seeds drop into the product collecting cage, or when the product collecting cage is eliminated from the product receiving case, the gel coated seeds are placed on the bottom cover.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENT

A preferred embodiment of the invention will now be described in detail referring to the accompanying drawings.

Figure 8:
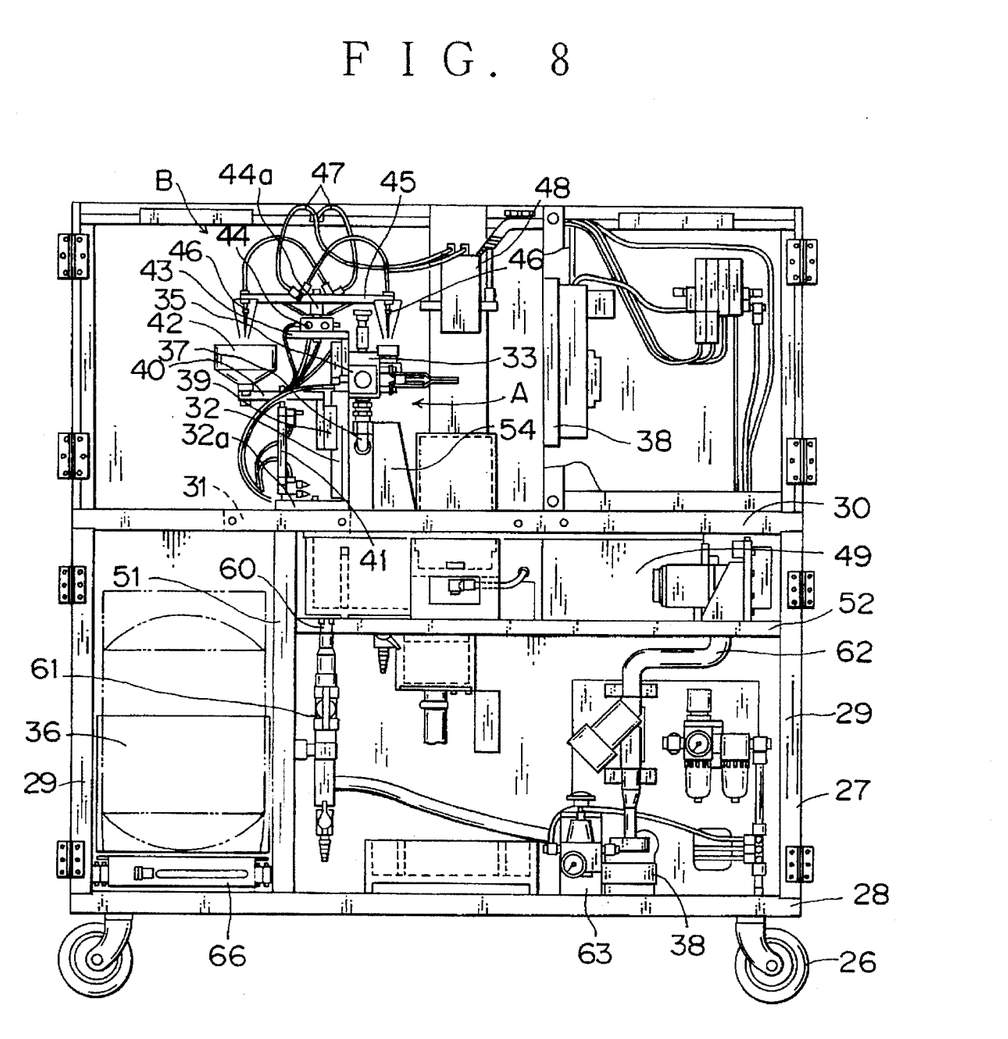
FIG. 8 is an elevational view showing an apparatus for coating seed with gel according to the invention.

As shown in elevational view of FIG. 8, an apparatus for coating seed with gel is housed in a casing 27 with a caster 26.

The casing 27 comprises a supporting board 31 which is mounted on an intermediate beam 30 coupled to an intermediate portion of a pillar 29 which stands at four corners of a bottom wall 28, and an opening and closing door (not illustrated) is provided in front thereof.

A stationary stand 32a which is provided for a lower end portion of a supporting pillar 32 connects to a screw on the supporting board 31, a gel processing nozzle A is fixed to a right side of the supporting pillar 32.

Figure 12:
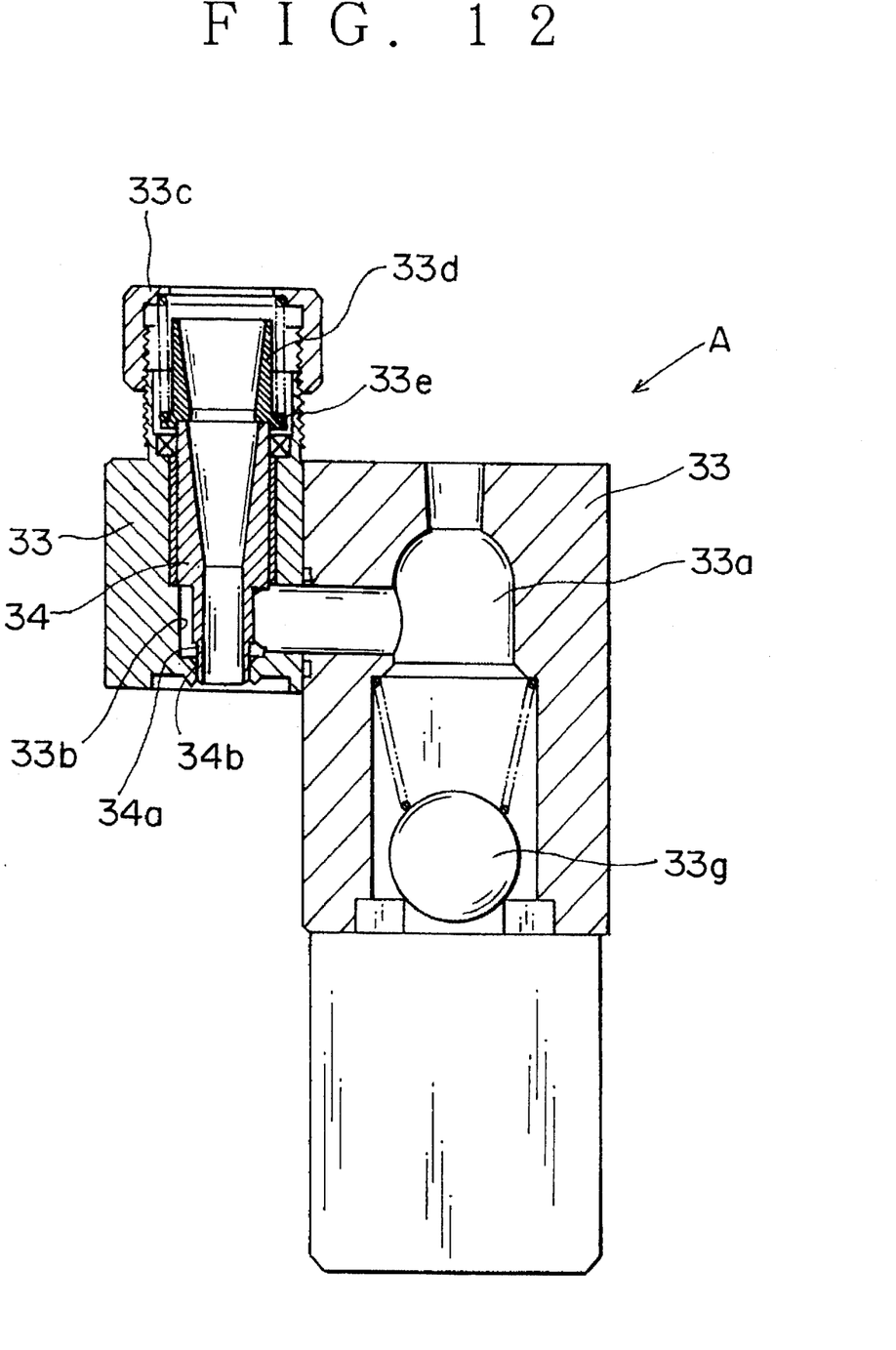
FIG. 12 is a vertical sectional view showing a processing nozzle.

As shown in FIG. 12, the gel processing nozzle A is provided with a nozzle body 33, which forms a gel accommodation part 33a therein containing the gelation agent, and provided with a cylindrical plunger 34 which forms a valve 34a downward thereof opening and closing a plunger insertion port 33b penetrating the nozzle body 33 in an up and down direction. The plunger 34 is inserted in such a what that it is capable of ascent and descent into the plunger insertion port 34b which communicated with the gel accommodation part 33a. An air cylinder (referring to FIG. 8) pressurizes the gel accommodating part 33a.

Since a pressure adjusting cover 33c is screwed to a male screw provided for an upper portion of the nozzle body 33 and a spring 33e is inserted between a pressing member 33d which is placed on the plunger 34 and the pressure adjusting cover 33c, the plunger 34 is energized downward.

Consequently, a valve 34a of the plunger 34 usually closes the bottom end portion of a plunger insertion port 34b.

A pipe passage 37 which is communicated to gelation agent tank 36 (referring to FIG. 8) placed on the bottom wall 28 is coupled to a non-return valve 33g which communicated with the gel accommodation part The gelation agent tank 36 is capable of being pulled out of the casing 27 by virtue of a slide mechanism 66 provided for the bottom wall 28.

A piston of an air cylinder 35 is operated by instruction from a control portion which is housed in control case 38 provided for the inside of the casing 27. It causes the gelation agent within the gel accommodation part 33a to be pressurized so that the cylindrical plunger 34 opens the valve because of an ascent of the cylindrical plunger 34. The gelation agent which flows out of the gel accommodation part 33a forms gel film downward of the plunger 34.

The gelation agent within the gelation agent tank 36 is supplied into the gel accommodation part 33a by way of both the pipe passage 37 and the non-return valve. When the piston of the air cylinder 35 returns to its former state, the inside of the gel accommodation part 33a becomes depressurized.

A container supporting member 40 is provided for slide guide plate 39 provided at left side surface of the supporting pillar 32 as being capable of ascent and descent. The pointed end of the piston of an air cylinder 41 which is mounted on the stationary stand 32a of the supporting pillar 32 is fixed to the container supporting member 40.

A seed container 42 the upper part of which is opened is fixed to the upper end of the container supporting member 40, The seeds are contained in the seed container.

A rotary actuator 44, which revolves through an angle of 180° while it reciprocates, is mounted on an upper plate 43 provided for the top of the supporting pillar 32 and the central part of a rotational arm 45 is fastened to an axis of rotation of a rotary actuator 44.

A hollow absorption tip 46 is fastened to both end portions of the rotational arm 45. A tube 47 which is fixed to the upper end of the hollow absorption tip 46 is communicated to a pneumatics source and a negative pressure source through an electromagnetic valve 48. The seed supply mechanism B is constituted as described above. When one absorption tip 46 exists right above of the seed container 42, the other absorption tip 46 exists right above (referring to FIG. 8) of the cylindrical plunger 34 (referring to FIG. 12) of the gel processing nozzle A.

When the seed container 42 rises, negative pressure is supplied to the absorption tip 46. The seeds are applied with suction by the lower end of the absorption tip 46. Next, a pneumatics source is supplied to the absorption tip 46 after the rotational arm 45 revolved through an angle of 180°. The seeds are supplied while dropping into the cylindrical plunger 34 (referring to FIG. 12) of the gel processing nozzle A. The seeds are placed on the gel film the center of which is hanging vertically.

The plunger 34 (referring to FIG. 12) opens the valve again, and the gel film encapsulates the seed and air bubble. The gel film the weight of which is increased, drops since the gel film can not support its own weight. While falling it causes the gel film to be balled, is supplied downwardly to a hardening bath 49.

On the other hand, the remaining gel which did not drop, at the lower surface of the gel processing nozzle A, forms a new gel film which is waiting for the supply of the next seed.

A stage 52 is provided between a lower pillar 51 and the pillar 29 both of which are provided between the intermediate beam 30 and the bottom wall 28. The hardening bath 49 and a water wash bath 50 as shown in FIG. 9 are mounted on the stage 52.

Figure 9:
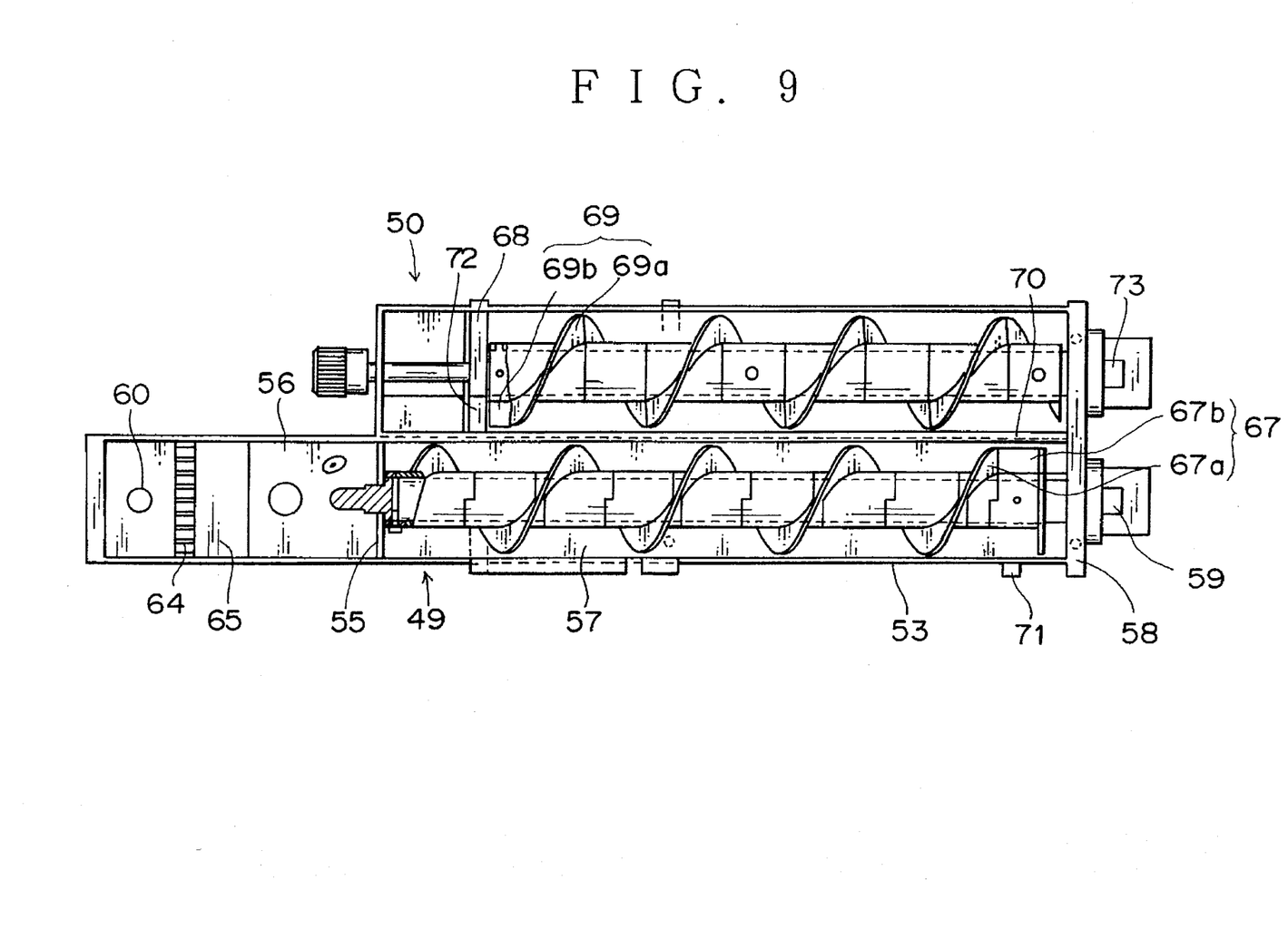
FIG. 9 is a plan view showing a hardening bath and a water wash bath according to the present invention.

In the hardening bath 49, as shown in FIG. 9, a guide pipe 54 (referring to FIG. 8) which becomes the falling supply passage of the gal coated seeds is provided for the upper portion of a hardening bath body 53 shaped long from side to side having an opening upwardly. A partition wall 55 (referring to FIG. 9) is provided at a right end side downward of a guide pipe 54.

In a hardening bath body 53, a deep seed receiving portion 56 is formed at left side of the partition wall 55, and a shallow conveyance passage 57 having the semicircular bottom wall is formed at right side of the partition wall 55.

An outflow pipe 59 is provided for a side wall 58 at a right side of the hardening bath body 53. An inflow pipe 60 is provided for the left end portion of the bottom wall of the receiving portion 56. A valve 61 is coupled to the inflow pipe 60. (referring to FIG. 8).

A pipe passage 62, which is connected to the outflow pipe 59, is connected to the valve 61 by way of a pump 63 which is located on the bottom wall 28. (referring to FIG. 8).

In the bottom wall of the receiving portion 56, straightening vane 64 are provided uprightly at the right side of the inflow pipe 60. A horizontal guide wall 65 extends in the right direction toward the right side surface of the straightening vanes 64.

The top end surface of the straightening vane 64 is formed on reconciliation with the horizontal surface. Accordingly, the amounts of the hardening agent overflowed from the top end surface of the straightening vane 64 are uniform about the width direction of the hardening bath body 53.

If a horizontal guide wall does not exist, since the hardening agent overflowed from the top end surface of the straightening vane 64 swirls inward the receiving portion 56 caused by the falling velocity of overflow, the harmful effect in which the flow of the hardening agent does not become a straightened flow, occurs.

The horizontal guide wall 65 guides horizontally guides the hardening agent overflowed so that it prevents an occurrence of swirl.

The top end of the partition wall 55 is lower than the liquid level of the hardening agent contained in the hardening bath body 53. The hardening agent in the receiving portion 56 is supplied to the conveyance passage 57 in the condition of the flow.

There is provided a screw feeder 67 having a screw vane 67a and a sweeping blade 67b at the right end portion between the partition wall 55 and the side wall 58.

The water wash bath 50 integrally formed with the hardening bath 49 comprises the bottom wall shaped semicircular and is deeper than the hardening bath, the side wall to the right end thereof formed by the side wall 58 of the hardening bath 49 (referring to FIG. 9), a screw vane 69a on the peripheral surface of both an internal side wall 68 provided at the left side and the side wall 58, and a screw feeder 69 having a sweeping blade 69b at the left end in which both end portions of the screw feeder 69 are supported rotatably.

The hardening bath 49 comprises a communicating passage 70 which is formed in such a way that a part of the upper surface of the boundary wall to the water wash bath makes a notch in the right side end portion as shown in FIG. 9, a pneumatics portion 71 (referring to FIG. 9) which supplies toward the water wash bath with air pressure arranged therein, when the sweeping blade 67b of the screw feeder 67 of the hardening bath 49 lifts up the gel coated seeds of the conveyance passage 57, the gel coated seeds are shifted to water wash bath 50 through the communicating passage 70 by virtue of the air pressure injected from the pneumatics portion 71.

An outflow weir 72 is formed at the top end portion of the internal side wall 68 of the water wash bath 50 so that the supplied water from an inflow pipe 73 provided for the side wall 58 overflows the outflow weir 72 together with the gel coated seeds, the water and the coated seeds fall and are supplied to a product collecting portion C which will be described hereinafter.

Figure 1:
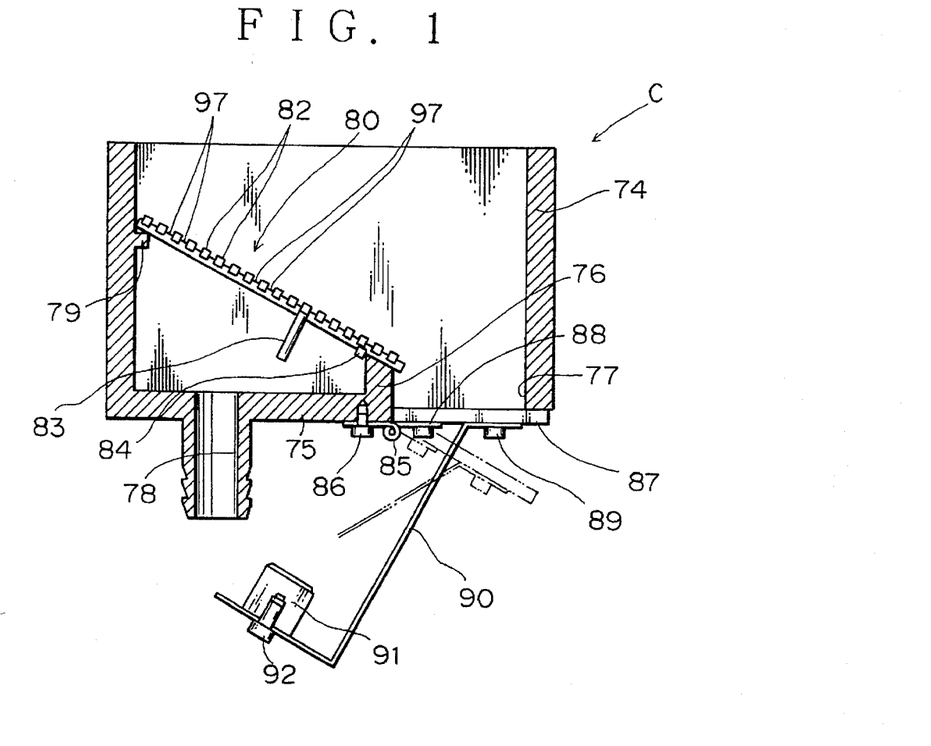
FIG. 1 is a vertical sectional view showing a product collecting device according to the present invention.

The structure of the product collecting portion C as shown in FIG. 1, comprises a low partition wall 76 at a bottom wall 75 of a product receiving case 74 opened at the top portion, a product collecting port 77 at the right side of the bottom wall 75 of the partition wall 78, left side of the partition wall 78 which is right under the outflow weir 72 of the water wash bath 50, and a draining port 78 provided for the bottom wall 75.

A projection 79 is provided for the left side inner wall surface of the product receiving case 74. A drain chute 80, both ends of which are placed between the projection 79 and the partition wall 78, has a slope declining toward a product collecting port 77.

Figure 4:
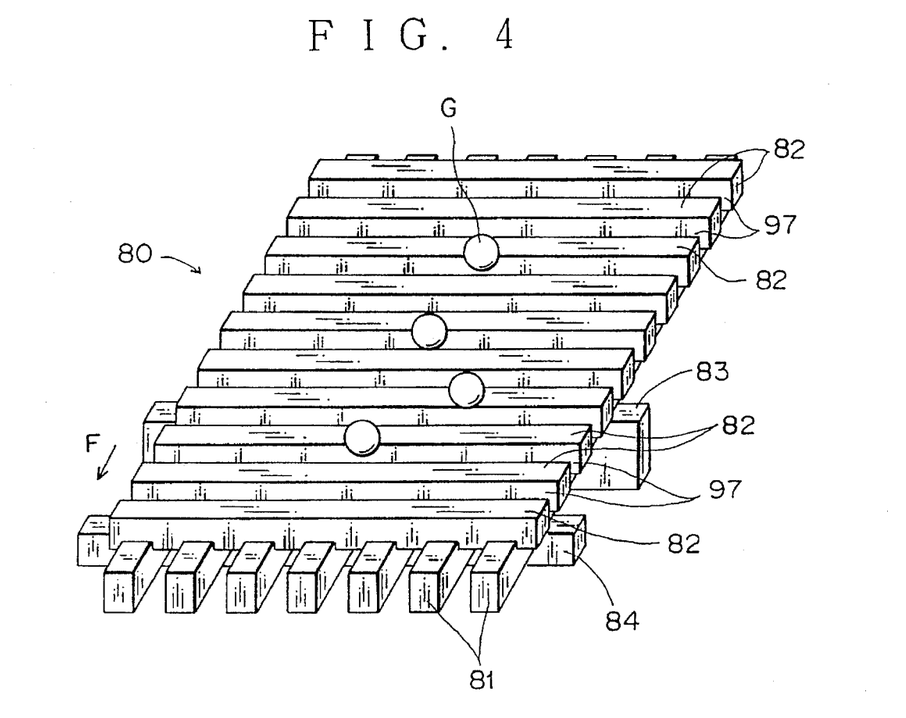
FIG. 4 is perspective view showing a drain chute according to the present invention.
Figure 5:
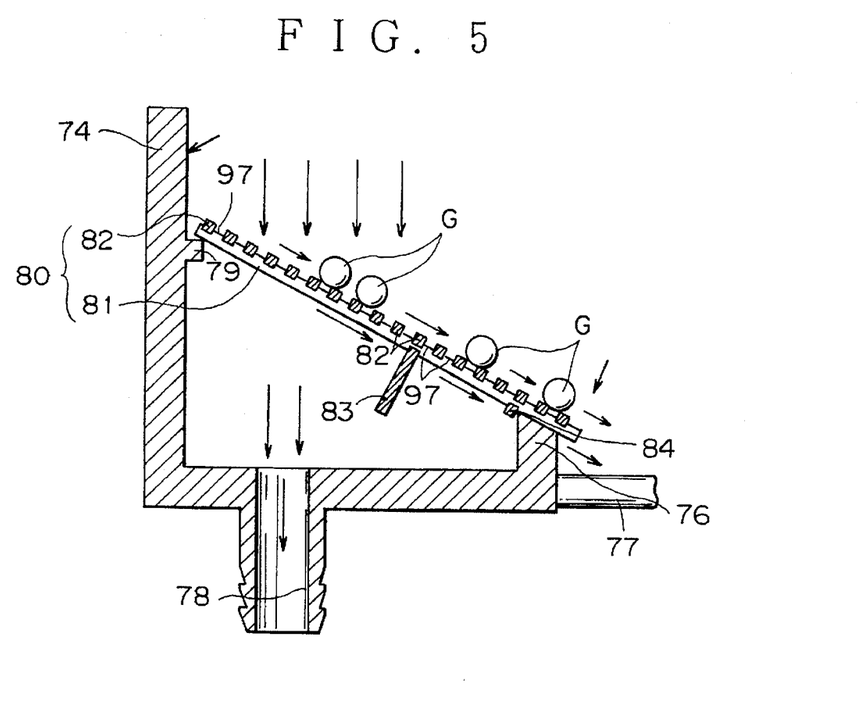
FIG. 5 is a vertical sectional view showing an operation of the drain chute.

The drain chute 80, as shown in FIGS. 4 and 5, comprises a plurality of supporting poles 81 which are provided in such a way that they are long in a parallel direction to the inclined direction and arranged at a constant interval to each other. A plurality of square shaped poles 82 are provided in such a way that they are long in a perpendicular direction to the inclined direction and are arranged at constant intervals over the supporting poles 81. A shelter plate 83 is provided downward of the supporting poles 81. An engaging portion 84 is provided for the right end portion at a lower direction of the supporting pole 81 engaged in the partition wall 76.

Water breaking hole 97 are formed between the adjacent square shaped poles 82.

Figure 2:
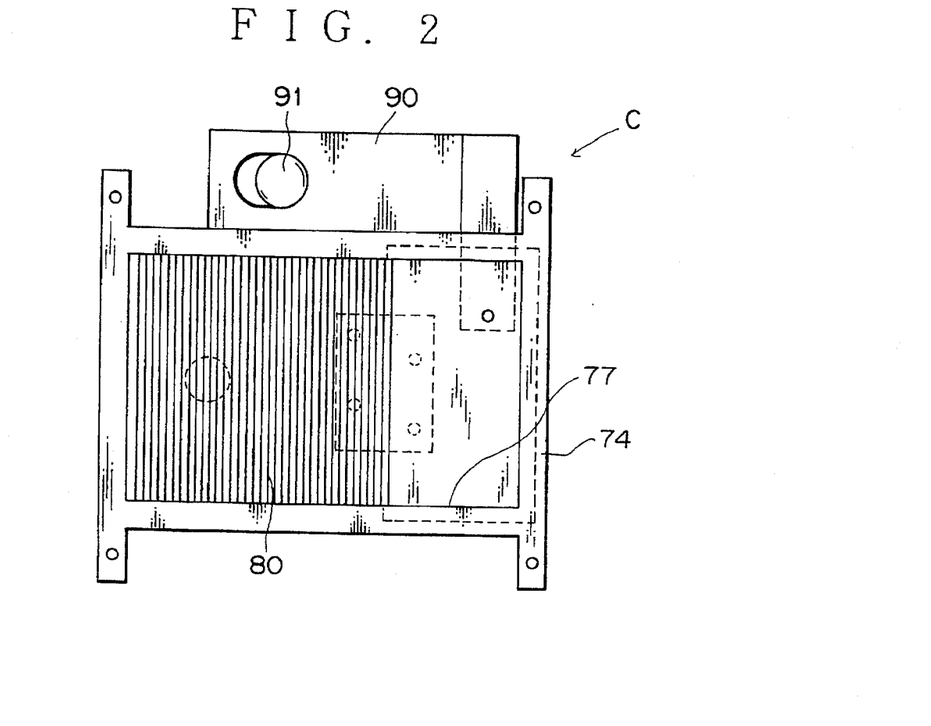
FIG. 2 is an elevational view of FIG. 1.
Figure 3:
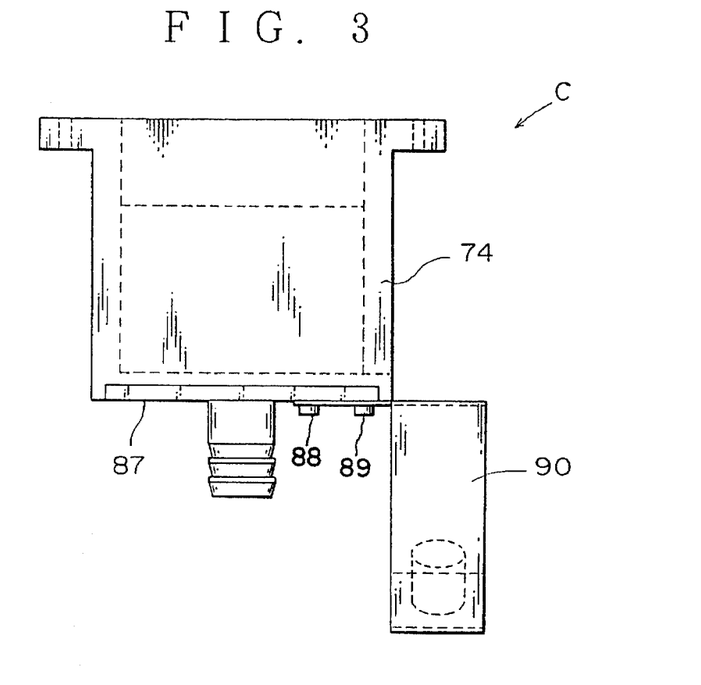
FIG. 3 is a side elevational view of FIG. 1.

One end of a hinge 85 is connected by a screw 86 on the lower face of the product collecting port 77, and the other end of the hinge 85 is connected to a screw 88 on a bottom cover 87 which opens and closes the product collecting port 77. Screw 89 on bottom cover 87 connects a lever 90 for opening and closing the bottom cover 87. A weight 91 is fastened to the pointed end of the lever 90 means of a screw 92 (referring to FIGS. 1, 2, and 3).

Consequently, the bottom cover 87 is energized in the direction that the bottom cover 87 closes the product collecting port 77.

Figure 6:
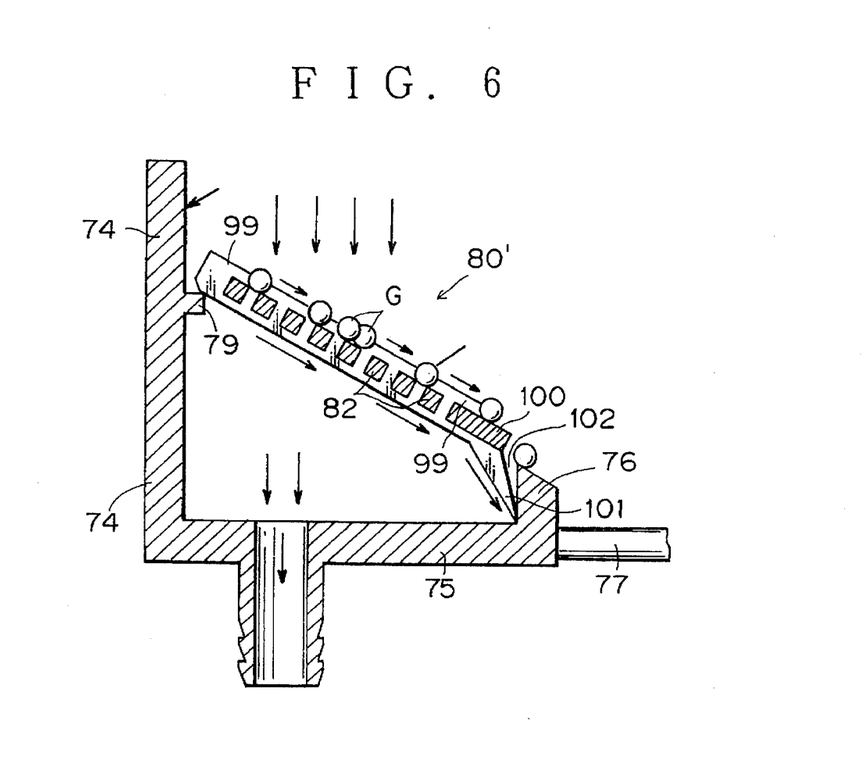
FIG. 6 is a vertical sectional view showing an operation of the drain chute according to the second embodiment of the present invention.

FIG. 6 is a vertical sectional view showing the second embodiment of a drain chute 80' according to the present invention.

The drain chute 80' comprises two side plates 99 which are provided in such a way that they are long in a parallel direction to the inclined direction. A plurality of square shaped poles 82 are provided in such a way that they are long in a perpendicular direction to the inclined direction and constant intervals each other between the two side plates 99. A plate like pole 100 both ends of which are fixed between the two side plates 99, is arranged with a gap on the lowest end portion of the square shaped pole 82. A leg 101 is provided for the lower side end portion of the two side plates 99.

In regard to the leg 101, as shown in FIG. 6, since the lower end portion is inclined toward outwardly, when the upper side end portion of the drain chute 80' is placed on the projection 79 provided on the inner wall surface of the product receiving case 74, the leg 101 is placed on the right end portion of the bottom wall 75, an opening 102 for water breaking is formed between the plate like pole 100 and the partition wall 76.

Since the width of the opening 102 for water breaking is narrow and the plate like pole 100 is located higher than the partition wall 76, the gel coated seeds G which rolls on drain chute 80' do not drop into the opening 102 for water breaking.

Figure 7:
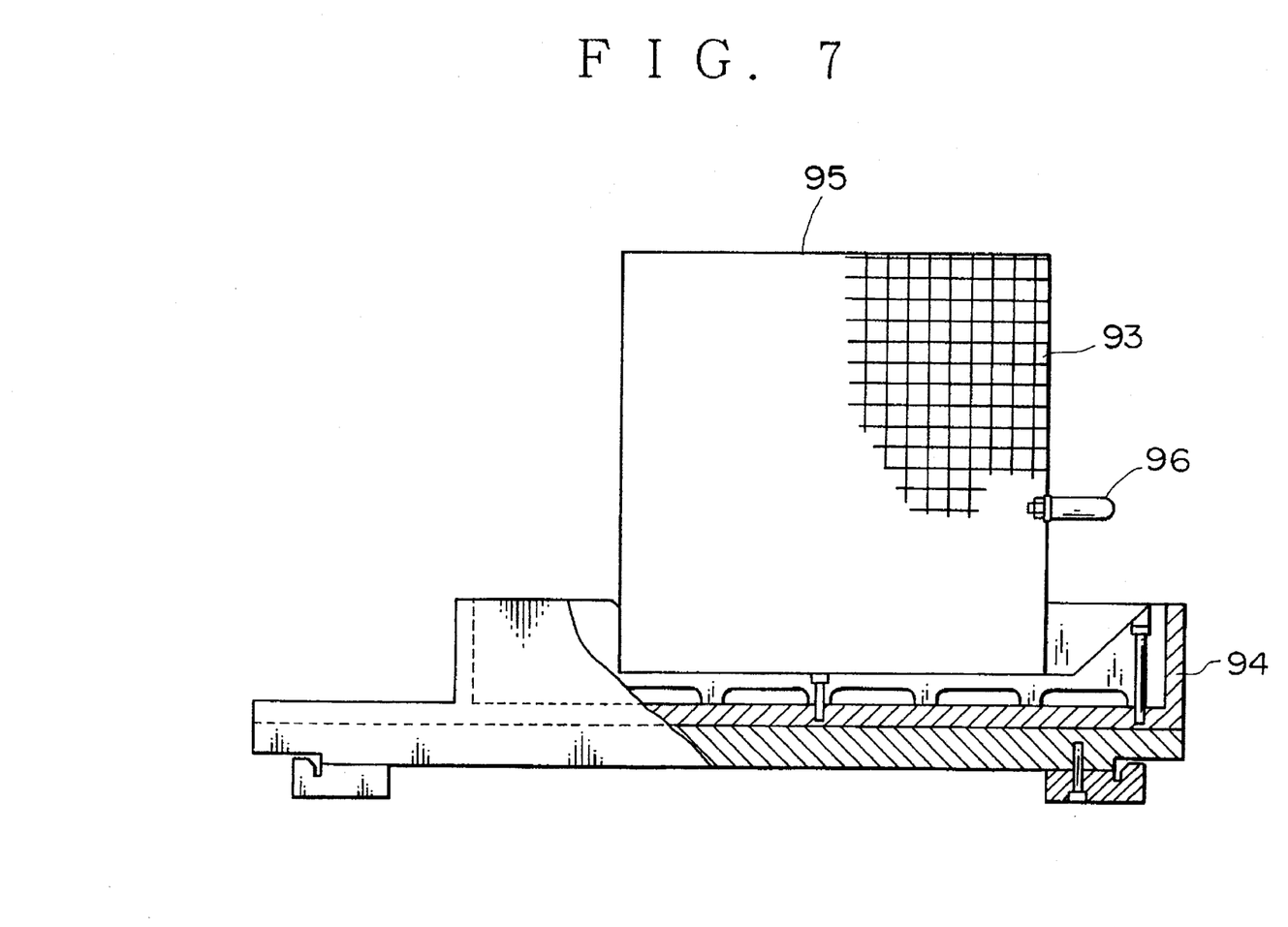
FIG. 7 is an elevation partly in section showing a product collecting cage placed on a stand.

In a downward direction of the product collecting portion C constituted above, a stand 94 is arranged so as to place the product collecting cage 93 in such a way that the product collecting cage 93 is universally placed during installation and removal thereon (referring to FIG. 7).

The product collecting cage 93 comprises a net provided mainly with an opening 95 formed in the upper direction, and a handle 98 for carrying.

When the product collecting cage 93 is placed on the stand 94, the product collecting cage 93 pushes the lever 90 for opening the cover toward the left side direction in FIG. 1.

Next, the operation of the product collecting portion C for the gel coating processing apparatus for seeds constituted above will be explained together with the whole operation of the apparatus for coating seeds with gel.

In the gel processing nozzle A, the piston of the air cylinder 35 operates such that the cylindrical plunger 34 (referring to FIG. 12) moves upward and opens the valve. The gelation agent which overflowed renders the gel film to form in a downward direction of the plunger 34.

The absorption tip 46 supplied with negative pressure sucks in the seeds of the seed container 42. Then the rotational arm 45 revolves through an angle of 180° so as to cause the rotational arm 45 to be located directly above the cylindrical plunger 34 (referring to FIG. 12). The air pressure is supplied to the absorption tip 46 thereby the seeds are sucked in to the absorption tip 46 and are supplied while dropping into the gel film which is hanging down in the gel processing nozzle A.

The plunger 34 opens the valve again, and the gel film encapsulates the seed and an air bubble. The gel film, the weight of which is increased, drops because the gel film can not support its own weight. While falling it causes the gel film to be balled, and is supplied to the receiving portion 56 of the hardening bath 49 in the downward direction.

In the hardening bath 49, since a straight flow which flows from the receiving portion 56 to the conveyance passage 57 is formed, the gel coated seeds supplied to the receiving portion 56 arrives at the conveyance passage 57 within approximately a determined time. Then the seeds are carried by the screw feeder 67. When the sweeping blade 67b of the screw feeder 67 of the hardening bath 49 lifts up the gel coated seeds of the conveyance passage 57, the gel coated seeds are shifted to water wash bath 50 through the communicating passage 70 by virtue of the air pressure injected from the pneumatics portion 71.

Consequently, the time when the gel coated seeds are immersed into the hardening agent is approximately fixed, thickness of the hardening layer of the gel surface is approximately fixed, with the result that the hardening is prevented from being underdeveloped.

The gel coated seeds G are shifted to the water wash bath 50 and are carried to the inner side wall 68 by the revolution of the screw feeder 69. The seeds overflow from the outflow weir 72 of the inner side wall 68 together with the water, and drop onto the drain chute 80 of the product collecting portion C.

When the product collecting cage 93 is placed on the stand 94, since the bottom cover 87 opens because the lever 90 for opening the cover is pushed by the product collecting cage 93, the globular gel coated seeds G drop onto the drain chute 80 and roll on the square shaped pole 82, passing through the product collecting port 77, and are collected into the product collecting cage 93.

On the other hand, the water drops into the drain chute 80 and drops in a downward direction since the water can not pass the water breaking hole 97. Then the water is washed out through the draining port 78.

When the drain chute 80' according to the second embodiment is used for the drain chute 80, the gel coated seeds falling velocity of which is increased because of rolling on the plate like pole 100 pass, and drop into the product collecting port 77, and then are being collected in the product collecting cage 93.

Even if the water drop adheres to the surface of the plate like pole 100, since the water can not pass through the opening 102 for the water breaking, the water drops in downward direction, and is washed out from the draining port 78.

Consequently, the separation of the gel coated seeds G from the water becomes more certain.

If the product collecting cage 93 accumulated with the gel coated seeds is taken out from the stand 94, the bottom cover 87 is closed, then the gel coated seeds are placed on the bottom cover 87.

Next, the empty product collecting cage 93 is placed on the stand 94, by doing so the bottom cover 87 again opens and the gel coated seeds are contained into the product collecting cage 93.

Consequently, even if the apparatus for coating seeds with gel is carried out in an automatic operation, it is capable of replacement for the product collecting cage 93.

Since the present invention is composed of the content described above, it has the following effects as will be described.

(1) The water and the gel coated seeds are supplied to the product collecting portion. By doing so, the gel coated seeds are fed to the product collecting port of the product receiving case while rolling on the draining chute. Since the water is completely prevented from flowing to the product collecting port by the water breaking hole of the draining chute, the water is perfectly separated from the gel coated seeds.

In the draining chute according to the second embodiment, since the opening for the water breaking is also formed between the draining chute and the partition wall, the separation of the gel coated seeds from the water becomes more certain.

(2) When the product collecting cage is placed in the downward direction of the product collecting port for the product receiving case, since the bottom cover opens, the gel coated seed dropped into the product collecting port, are collected into the product collecting cage. When the product collecting cage accumulated with the gel coated seeds is taken out from the stand, the bottom cover is closed. Then the gel coated seeds are placed on the bottom cover. Even if the apparatus for coating seeds with gel is carried out in an automatic operation thereof, it is capable of replacement for the product collecting cage.

While preferred embodiments of the invention have been described using specific terms, such description is for illustrative purpose only, and it is to be understood that changes and variations may be made without departing from the spirit or scope of the following claims.

What is claimed is:

1. A product collecting device for use in an apparatus for coating seeds with a gel in which a surface of gel coated seeds are rinsed in a water wash bath, then the gel coated seeds are carried out from the water wash bath and are collected by means of the product collecting device, the product collecting device comprising:

a product receiving case having an open top portion, sides, and a bottom wall;

a partition wall extending upward from the bottom wall;

a product collecting port provided on one side of the partition wall, said partition wall having a slope toward the product collecting port;

a draining hole provided on the other side of the partition wall, said draining hole located directly under a carrying out side end portion for the water wash bath;

a draining chute arranged over said draining hole and above the bottom wall, said draining chute having an inclined slope toward said product collecting port such that the gel coated seeds can roll on the draining chute to the product collecting port; and a plurality of water breaking holes arranged in the draining chute such that they cross at right angles to said product collecting port.

2. A product collecting device for use in an apparatus for coating seeds with gel according to claim 1, further comprising:

a leg which extends downward from the draining chute toward the bottom wall, said leg provided on a lower side of said draining chute at an end; and an opening formed between said end of said draining chute and said partition wall when said leg is placed on the bottom wall of said other side of the partition, wherein a width of said opening is the size in which the gel coated seeds, which roll on the draining chute, pass over without dropping therethrough.

3. A product collecting device for use in an apparatus for coating seeds with gel according to claim 1, further comprising:

a bottom cover, which is capable of opening and closing said product collecting port, mounted to said product receiving case; and a lever for opening and closing the cover, said lever provided on an outer bottom surface of said bottom cover.

* * * * *